April 11, 1967    D. K. HOPKINS    3,313,535
OXYGEN-FUEL LANCE
Filed Jan. 25, 1965
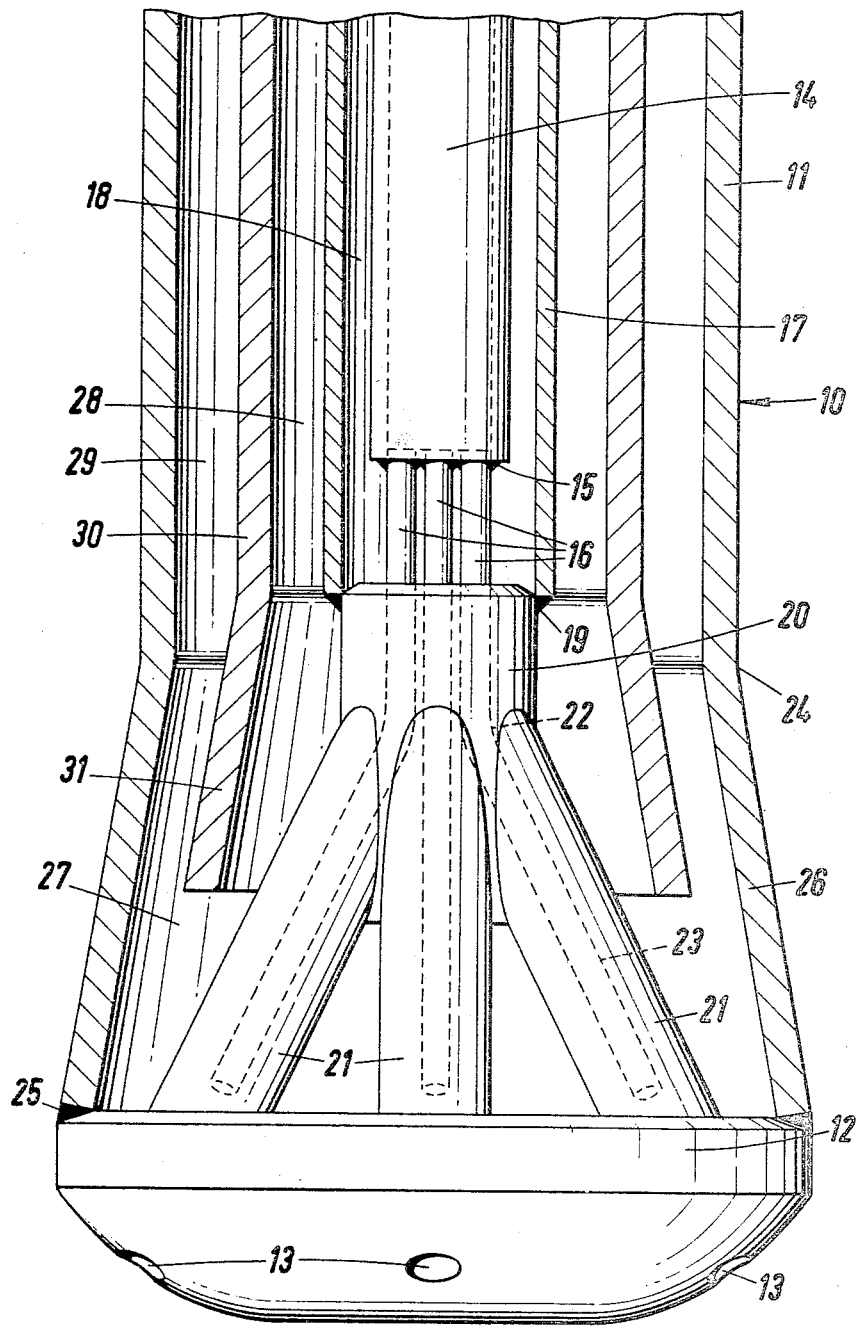
INVENTOR
DAVID KENNETH HOPKINS
BY Toulmin & Toulmin
ATTORNEYS United States Patent Office 3,313,535
Patented Apr. 11, 1967

3,313,535
OXYGEN-FUEL LANCE
David K. Hopkins, Port Talbot, Glamorgan, Wales, assignor to The Steel Company of Wales Limited, Glamorgan, Wales
Filed Jan. 25, 1965, Ser. No. 427,590
Claims priority, application Great Britain, Jan. 27, 1964, 3,406/64
3 Claims. (Cl. 266—34)

This invention relates to steel manufacture and particularly to apparatus for the injection of oxygen or other fluids (hereafter referred to as oxygen) into steel refining apparatus, such as an open hearth furnace or a top blown converter. The invention is also concerned with the provision of a multi-purpose lance which may be used not only for the injection of oxygen into steel refining apparatus, but which may also be used as a burner whereby fuel oil may be mixed with the oxygen supply to provide a heating flame which can be used, for example for the preheating or melting of the initial charge of scrap in the converter.

The present invention has for its object to provide an improved multi-purpose lance for the injection of oxygen or fuel oil and oxygen which is greatly simplified in construction and which is also easily adjustable so as to give a certain amount of control over the flame.

In this broader aspect the present invention provides a lance for use in steel refining apparatus, which lance comprises an elongated body member having a fuel supply conduit centrally located therein and an oxygen supply conduit surrounding said fuel supply conduit to provide an annular passageway for the supply of oxygen, wherein the body member is provided with a delivery nozzle at one end thereof formed with a plurality of discharge orifices communicating with said oxygen supply conduit through a plurality of short pipes disposed at an angle to the longitudinal axis of the lance, and wherein the fuel supply conduit is provided at its lower end with a plurality of fuel supply pipes extending therefrom and each having its end portion situated centrally in a corresponding oxygen supply pipe so that oxygen flowing through supply pipes to the discharge orifices will flow in an annulus around the end of the corresponding fuel supply pipes whereby fuel will be entrained in the oxygen supplies as discharged from the discharge orifices. The arrangement is such that the central fuel conduit is movable in and out relative to the elongated body member of the lance so that the fuel supply pipes may be adjusted in position in the oxygen supply pipes extending from the main oxygen supply conduit. This arrangement gives the operator a certain amount of flame adjustment for the lance.

In the preferred embodiment the lance is intended for use with fuel oil and the body member is provided with cooling means in the form of annular passageways surrounding the fuel and oxygen supply conduits. Preferably the cooling fluid passes downwardly through an annular passageway surrounding the oxygen supply conduit to the delivery nozzle of the lance and then returns upwardly through an outer annular passageway located in the lance adjacent the outer surface thereof.

The invention will now be described by way of example with reference to the accompanying drawing, the single figure of which is a part sectional elevation of the lower part of a multi-purpose lance in accordance with the invention.

In the embodiment as shown in the drawing the multi-purpose lance 10 comprises an elongated body member 11 which is provided with a combined delivery and burner nozzle 12 at the lower end thereof. The interior of the body member 11 of the lance 10 is built up of a number of annular passageways or conduits by which oxygen and fuel oil are supplied to a plurality of discharge orifices 13 formed in the discharge and burner nozzle 12. A fuel oil supply conduit is preferably located centrally of the body member 11 of the lance 10 and comprises a copper pipe 14 to the lower end of which there is welded as at 15 a plurality of short supply pipes 16 which extend downwardly therefrom and which correspond in number to the number of discharge orifices 13 as will be hereinafter described.

An oxygen supply conduit comprises a pipe 17 forming an annular passageway 18 around the oil supply pipe 14 to permit the free flow of oxygen downwardly towards the discharge and burner nozzle 12 of the lance. The lower end of the oxygen supply pipe 17 extends beyond the lower end of the oil supply pipe 14, so that a portion of each of the fuel oil supply pipes 16 is located within the oxygen supply pipe 17. The lower end of the oxygen supply pipe 17 is connected, for example by welding as at 19, to a discharge head 20 from which extends a plurality of oxygen supply pipes 21 located at an angle to the main longitudinal axis of the lance, for example at an angle of about 25°.

In the preferred arrangement the lance 10 is provided with six discharge orifices 13 and the oxygen supply conduit 17 is provided with six corresponding supply pipelines 21 for the simultaneous discharge of six streams of oxygen at an angle to the longitudinal axis of the lance. The short oil supply pipes 16 which extend downwardly from the lower end of the main oil supply conduit 14 extend in a cluster into the discharge head 20 of the oxygen supply pipe 17 and are then bent outwardly at 22 so that their outer ends 23 are each located in a corresponding oxygen supply pipe 21. The arrangement is such that the six streams of oxygen pass through the corresponding supply pipes 21 to the discharge orifices 13 in the form of annular streams around the ends 23 of the short oil supply pipes 16. The movement of the oxygen through the supply pipes 21 to the discharge orifices 13 ensures the entrainment of the fuel oil in the streams of oxygen when the lance 10 is being used as a burner.

The main oil supply conduit 14 is mounted for movement within the body member 11 of the lance 10 so that it can be adjusted upwardly or downwardly along the longitudinal axis of the lance. In this way the position of the ends 23 of the oil supply pipes 16 in the oxygen supply pipes 21 can be varied and this gives a certain amount of flame adjustment for the lance 10 when it is being used as a burner.

The outer casing which forms the body 11 of the lance extends around the oxygen supply conduit 17 and is flared outwardly at its lower end as at 24 to accommodate the outwardly directed oxygen supply pipes 21. The discharge and burner nozzle 12 is welded as at 25 to the flared outer end 26 of the outer casing of the body 11 of the lance and this nozzle 12 is dome shaped in construction and is provided as previously mentioned with the six spaced discharge orifices 13 to which the oxygen supply pipes 21 communicate.

The annular space 27 provided between the outer casing of the elongated body member 11 of the lance 10 and the outer surface of the oxygen supply conduit 17 is conveniently used for the supply of cooling fluid such as water. To this end the space is divided into two annular passageways 28, 29 by a further annular conduit 30 and the cooling water flows downwardly in passageway 28 through the elongated body member 11 around the outer surface of the oxygen supply conduit 17 into the discharge burner nozzle 12 of the lance and then returns upwardly through the annular passageway 29 formed adjacent the outer casing of the lance. The lower end 31 of conduit 30 is also flared outwardly to accommodate the oxygen supply pipes 21.

It will be appreciated that the invention provides a greatly simplified construction of lance which may be used for the injection of oxygen into steel refining apparatus, but which may also be used as a burner whereby fuel oil may be mixed with the oxygen supply. In the operation of the lance as a burner, fuel oil is supplied and is ejected into the oxygen streams as required. Obviously the supply of fuel oil can be carefully controlled so as to ensure complete combustion and the arrangement may be used for providing a heating flame for the preheating or melting of scrap, for example in a converter. Furthermore, the invention provides for the adjustment of the oil supply conduit so that further control and adjustment of the flame can be obtained. At any time by suitably cutting off the supply of fuel oil the lance will immediately continue to operate as an oxidising lance whereby oxygen is supplied through the delivery orifices in the form of a multi-jet oxygen lance. The lance may have particular application in an open hearth furnace as it is believed that its use may increase the life of the furnace and also reduce operating costs. Its operating position may be about six feet above the level of the charge and the reduction in splashing and refractory temperatures should therefore help in increasing the furnace life.

I claim:

1. A lance for use in steel refining apparatus, which lance comprises an elongated body member having a fuel supply conduit centrally located therein and an oxygen supply conduit surrounding said fuel supply conduit to provide an annular passageway for the supply of oxygen, wherein the body member is provided with a delivery nozzle at one end thereof formed with a plurality of discharge orifices communicating with said oxygen supply conduit through a plurality of short pipes disposed at an angle to the longitudinal axis of the lance, and wherein the fuel supply conduit is provided at its lower end with a plurality of fuel supply pipes extending therefrom and each having its end portion situated centrally in a corresponding oxygen supply pipe so that oxygen flowing through the supply pipes to the discharge orifices will flow in an annulus around the end of the corresponding fuel supply pipes whereby fuel will be entrained in the oxygen supplies as discharged from the discharge orifices.

2. A lance as claimed in claim 1, wherein the central fuel conduit is movable along the longitudinal axis of the lance relative to the oxygen supply conduit so that the fuel supply pipes may be adjusted in position in the oxygen supply pipes.

3. A lance as claimed in claim 1, in which the body member is provided with cooling means in the form of annular passageways surrounding the oxygen supply conduit.

No references cited.

J. SPENCER OVERHOLSER, *Primary Examiner.*

E. MAR, *Assistant Examiner.*